US005680754A

United States Patent [19]
Giffin et al.

[11] Patent Number: 5,680,754
[45] Date of Patent: Oct. 28, 1997

[54] COMPRESSOR SPLITTER FOR USE WITH A FORWARD VARIABLE AREA BYPASS INJECTOR

[75] Inventors: Rollin George Giffin; John Joseph Ciokajlo, both of Cincinnati; Lawrence Wayne Dunbar, Loveland, all of Ohio

[73] Assignee: General Electric Company, Cincinnati, Ohio

[21] Appl. No.: 478,304

[22] Filed: Feb. 12, 1990

[51] Int. Cl.[6] .................................................. F02K 3/02
[52] U.S. Cl. ............................................................. 60/226.1
[58] Field of Search ............................ 60/226.1, 226.3, 60/248, 262, 264, 266

[56] References Cited

U.S. PATENT DOCUMENTS

| | | | |
|---|---|---|---|
| 3,625,630 | 12/1971 | Soo | 415/207 |
| 3,765,792 | 10/1973 | Exley | 415/181 |
| 3,778,186 | 12/1973 | Bandukwalla | 415/481 |
| 3,841,091 | 10/1974 | Sargisson et al. | 60/224 |
| 3,879,941 | 4/1975 | Sargisson | 60/226 |
| 3,909,152 | 9/1975 | Rannenberg | 60/39.29 |
| 4,010,608 | 3/1977 | Simmons | 60/226 |
| 4,054,030 | 10/1977 | Pedersen | 60/262 |
| 4,068,471 | 1/1978 | Simmons | 60/262 |
| 4,069,661 | 1/1978 | Rundell et al. | 60/204 |
| 4,072,008 | 2/1978 | Kenworthy et al. | 60/261 |
| 4,080,785 | 3/1978 | Koff et al. | 60/226 |
| 4,175,384 | 11/1979 | Wagenknecht et al. | 60/226 |
| 4,214,610 | 7/1980 | James et al. | 60/226.3 |
| 4,222,233 | 9/1980 | Johnson et al. | 60/225 |
| 4,349,314 | 9/1982 | Erwin | 415/181 |
| 4,409,788 | 10/1983 | Nash et al. | 60/226.3 |
| 4,445,816 | 5/1984 | Ribaud et al. | 415/181 |
| 4,592,200 | 6/1986 | Benoist et al. | 60/261 |
| 4,791,783 | 12/1988 | Neitzel | 60/226.3 |
| 4,813,229 | 3/1989 | Simmons | 60/204 |
| 4,827,713 | 5/1989 | Peterson et al. | 60/39.07 |
| 4,969,326 | 11/1990 | Blessing et al. | 60/226.1 |

FOREIGN PATENT DOCUMENTS

| | | | |
|---|---|---|---|
| 0296058 | 12/1988 | European Pat. Off. . | |
| 2270450 | 12/1975 | France | 60/226.1 |
| 0586573 | 3/1947 | United Kingdom . | |
| 0980306 | 1/1965 | United Kingdom | 60/226.3 |
| 1324790 | 7/1973 | United Kingdom . | |
| 1523875 | 9/1978 | United Kingdom . | |
| 2192229 | 1/1988 | United Kingdom . | |

OTHER PUBLICATIONS

Gasdynamik, by Ernst Becker, pp. 71–79 1956.
Shepard, "Principles of Turbomachinery"—DeLaval nozzles including choked and supersonic flow and shock (1956, pp. 100–125).

*Primary Examiner*—Charles T. Jordan
*Attorney, Agent, or Firm*—Andrew C. Hess; Wayne O. Traynham

[57] ABSTRACT

The present invention is a unique splitter of a core engine compressor in a double bypass, variable cycle engine. The splitter is extended forward to a second fan section. The extended splitter may divide the rotor blades into outer and inner portions to allow the flow past these portions to act essentially aerodynamically independent of each other in a single or double bypass mode of operation of the variable cycle engine.

14 Claims, 2 Drawing Sheets

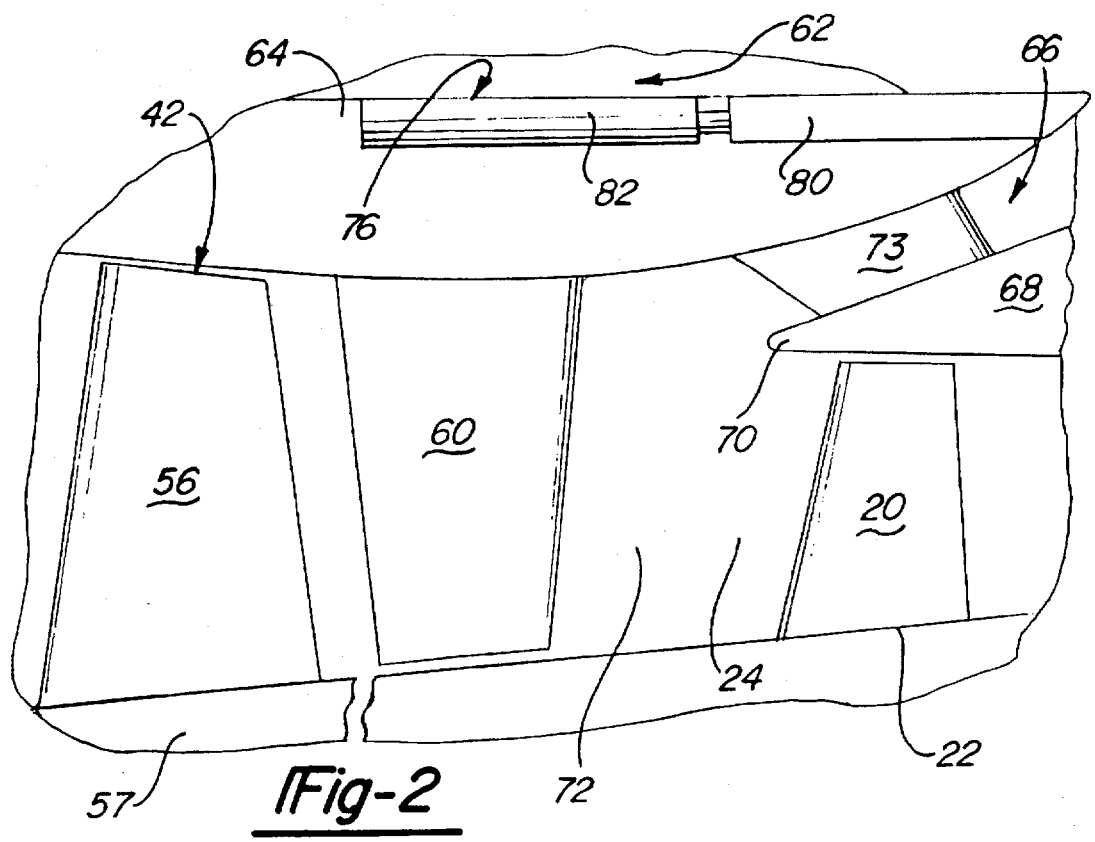
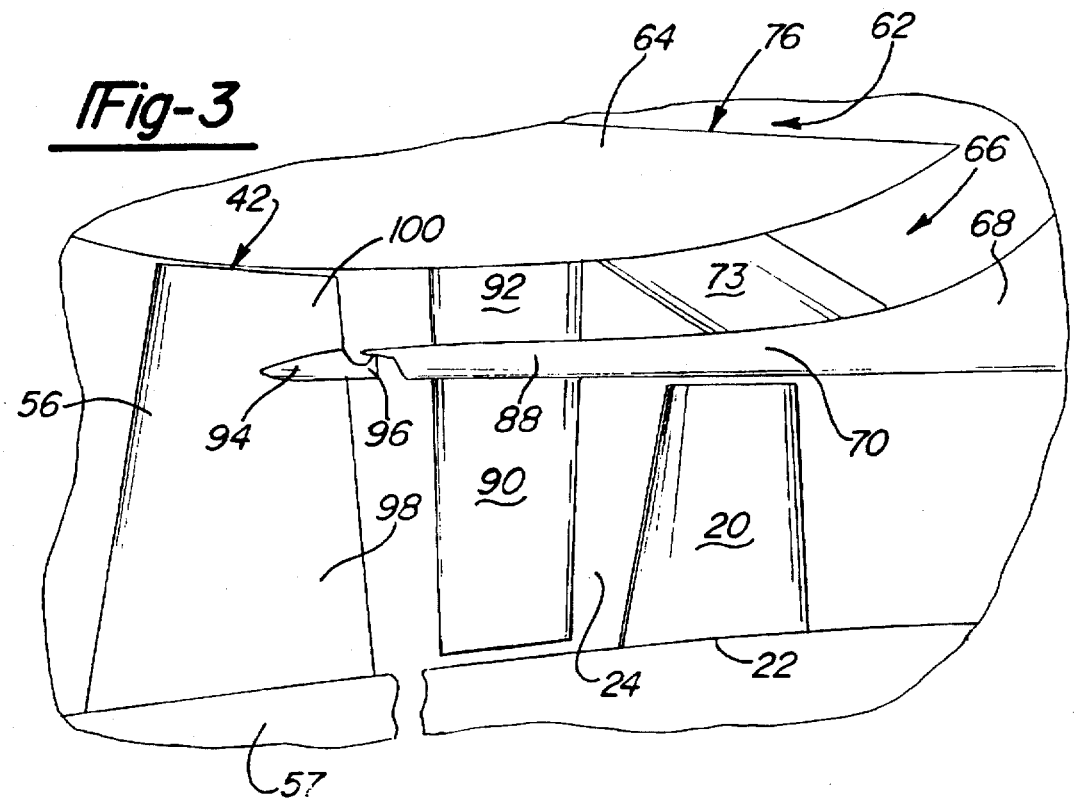

COMPRESSOR SPLITTER FOR USE WITH A FORWARD VARIABLE AREA BYPASS INJECTOR

BACKGROUND OF THE INVENTION

1. Field of the Invention

The present invention relates generally to variable cycle engines, and more particularly, to a variable area bypass injector for a variable cycle engine.

2. Description of Related Art

"Variable cycle" engines generally refers to a family of hybrid gas turbine engines which exhibit the high specific thrust characteristics of a low bypass ratio turbofan or turbojet engine at high power settings, and yet also exhibit relatively lower specific thrust, noise and fuel consumption levels, typically characteristic of a moderate bypass ratio turbofan engine at part power settings. One type of variable cycle engine construction is a double bypass, variable cycle gas engine. In this engine construction, a fan is split into two sections, with each section being in flow communication with a separate concentric bypass duct inlet leading to a bypass duct surrounding the core engine. The fan sections may be on the same or independent shafts. Further, each fan section may have multiple fan stages wherein each stage comprises a rotating blade and may have a stator blade or vane.

All of the engine airflow is pressurized by a first or front fan section. An upstream double bypass selector valve disposed in a first bypass duct inlet either directs all of the flow through a second or aft fan section for operation in a single bypass mode, or the valve splits the flow into an outer portion, which bypasses the second fan section, and an inner portion, which is further pressurized by the second fan section, for operation in the double bypass mode. Following the second fan section, the inner portion flow is further split with one portion being directed into a second bypass duct inlet and the other portion being directed into the core compressor.

Typically, a forward variable area bypass injector (VABI) is included in the second bypass duct inlet of a variable cycle engine to control the operating line of the second fan section. The first and second bypass duct inlets exit to a common bypass duct. The selected configuration for the forward VABI is a translating slider valve which is scheduled between opened and closed to vary the operating line of the second fan section. The operating line is a locus of points on a performance map of pressure ratio versus weight flow that describe the sections operation in concert with the engine. Typically, the bypass duct pressure level sets or determines the operating line of the second fan section. Commonly, an aft, or rear, VABI is provided at the end of a bypass duct for injecting bypass airflow back into the core engine flow. For a detailed description of this type of variable cycle engine, the reader is referred to U.S. Pat. No. 4,068,471, issued Jan. 17, 1978, assigned to the same assignee as the present invention, and the disclosed material of which is incorporated herein by reference.

In the single bypass mode of operation, the selector valve is closed and all of the first fan section airflow passes through the second fan section. In this single bypass mode, either the rear VABI, or the slider valve of the forward VABI can be modulated to control the operating line for the second fan section. During normal high corrected speed operation, the slider valve of the forward VABI is opened. The rear VABI, in conjunction with the selected component design pressure ratios, is set to simultaneously match the core engine exit pressure, in a desired manner, with a desired operating line for the second fan section. The bypass pressure loss from the second fan section exit to the rear VABI tends to be advantageously small when in this mode.

However, at part power, or part corrected speed, the core engine exit pressure drops relative to the second fan section exit pressure. This pressure drop can cause the operating line for the second fan section to drop, impacting supercharging of the core engine inlet. To retain the operating line for the second fan section and supercharging of the core compressor inlet, either the rear VABI, the slider valve of the forward VABI, or a combination of the two, must have area reduction capability. As engine power is further reduced the core engine exit pressure becomes less than the pressure entering the second fan section. At that point, it may be desirable to bypass a portion of the airflow around the second fan section in the double bypass mode of operation. Before opening the selector valve and transitioning into the double bypass mode of operation, the pressure in the first bypass duct inlet must become less than the first fan section exit pressure.

One disadvantage of the above forward VABI is that a slider valve and an associated actuation system are required to retain the operating line of second fan section at part power or part correct speed, which results in increased mechanical complexity and weight of the engine. A further disadvantage of the slider valve and actuation system is that the pressure drop created by closing of the slider valve of the forward VABI is wasted energy to the cycle since it has to be pumped by the second fan section.

SUMMARY OF THE INVENTION

It is therefore a primary object of the present invention to provide a multiple bypass, variable cycle engine in which a slider valve of a forward VABI can be eliminated to reduce mechanical complexity and engine weight, while still maintaining the desired operating line of the second fan section.

It is also an object of the present invention to provide a second flow splitter for a double bypass, variable cycle engine which has minimal impact on supercharging of the core compressor inlet.

It is yet another object of the present invention to control the operating line for the second fan section with only a rear VABI in a single bypass operating mode of the double bypass, variable cycle engine.

Briefly stated, the above objects are accomplished in the preferred embodiment of the present invention wherein a unique splitter of flow going to a core engine compressor is included in a double bypass, variable cycle engine. The splitter is extended forward to at least the trailing edge of the second fan section to allow the airflow near the tip portion and hub portion to act essentially aerodynamically independent of each other.

The present invention eliminates the need for a slider valve on the forward VABI and allows the rear VABI to be modulated to control the operating line of the second fan section when the variable cycle engine is in a single bypass operating mode. This reduces the weight and mechanical complexity of the variable cycle engine. The present invention also substantially unaffects supercharging of the core compressor inlet. In the double bypass operating mode of the variable cycle engine, the present invention provides for a match between bypass duct pressure and the pressure at the exit of the first fan section, thereby eliminating the need for a slider valve on the forward VABI.

Other objects, features and advantages of the present invention will be readily appreciated as the same become better understood by reference to the following description when considered in connection with the accompanying drawings.

BRIEF DESCRIPTION OF THE DRAWINGS

FIG. 2 is an enlarged view of the circled portion of FIG. 1.

FIG. 3 is a view similar to FIG. 2 incorporating a compressor splitter according to the present invention.

DESCRIPTION OF THE PREFERRED EMBODIMENT

Figure 1:
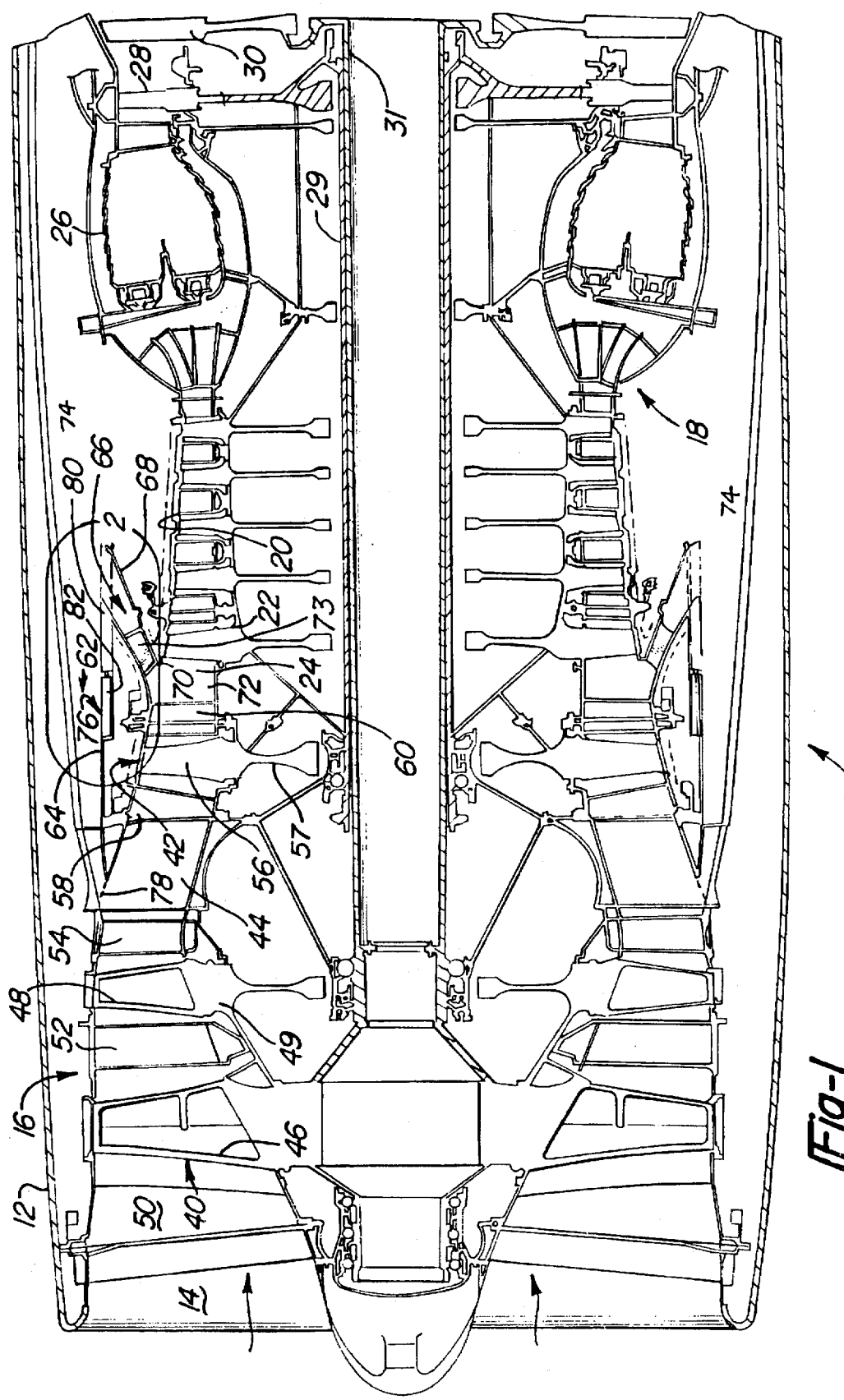
FIG. 1 is a cross-sectional view of a split fan, double bypass variable cycle engine.

Referring to the drawings, wherein like numerals correspond to like elements throughout, attention is first directed to FIG. 1. In FIG. 1, there is shown a conventional variable cycle engine 10, such as a split fan, double bypass variable cycle engine. The variable cycle engine 10 includes an outer casing or nacelle 12, the upstream end of which forms an inlet 14 sized to provide a predetermined airflow to the internal components of the engine 10. Disposed within the inlet 14 is a fan, generally shown at 16, for an inlet airflow. Downstream of the fan 16 is a core engine, generally shown at 18. The core engine 18 includes an axial flow compressor 20 having a rotor 22. Pressurized air from the fan 16 enters a core engine or compressor inlet 24 and is further compressed and discharged to a combustor 26 where fuel is burned to provide high energy combustion gases which drive a core engine turbine 28. The core engine turbine 28, in turn, drives the compressor rotor 22 through a shaft 29 in the usual manner of a gas turbine engine. Hot combustion gases can then pass to and drive a fan turbine 30 which, in turn, drives the fan 16 through a shaft 31 in the usual manner of a gas turbine engine. It should be appreciated the fan 16 may have a core driven fan section and/or a fan driven fan section as is commonly known in the art.

The fan 16 includes a first or forward fan section, generally indicated at 40, axially displaced from a second or rear fan section, generally indicated at 42, by an axial space designated generally at 44. The first fan section 40 includes one or more rows or stages of a plurality of rotor blades 46 and 48, which are circumferentially spaced apart about a first fan rotor 49. The rotor blades 46 and 48 are interspaced between rows of variable inlet guide vanes 50 and stator vanes 52 and 54. Similarly, the second fan section 42 includes a stage of a plurality of rotor blades 56 circumferentially spaced apart about a second fan rotor 57. The rotor blades 56 are interspaced between rows of variable stator vanes 58 and 60.

In order to bypass a portion of the airflow from the fan 16 around the core engine 18, there are provided two concentric bypass duct inlets. A first bypass duct inlet, shown generally at 62, is provided between the outer casing 12 and an intermediate casing 64. A second bypass duct inlet, shown generally at 66, is formed between the intermediate casing 64 and an inner casing 68, which houses the core engine 18. An upstream end or splitter 70 of the inner casing 68 terminates in an axial space 72 separating the second fan section 42 and the core engine 18 such that exiting airflow compressed by the second fan section 42 is divided between the second bypass duct inlet 66 and the inlet 24 to the core engine 18 as illustrated in FIG. 2. A strut 73 is disposed in the inner duct 66 between the intermediate casing 64 and the inner casing 68 and may guide inlet airflow into the inner duct 66. At the downstream end of the intermediate casing 68, the first bypass duct inlet 62 and second bypass duct inlet 66 merge into a common bypass duct, shown generally at 74.

Referring again to FIG. 1 and to FIG. 2, a forward variable area bypass injector (VABI) designated generally at 76 is used to increase the effective bypass ratio of the engine. The forward VABI 76 is associated with the intermediate casing 64, which separates the first bypass duct inlet 62 from the second bypass duct inlet 66. The forward VABI 76 comprises generally two variable geometry flow devices, a double-bypass selector valve 78 and a slider valve 80. The selector valve 78 may be of the translating valve type, which disclosed in U.S. Pat. No. 4,175,384—Wagenknecht et al which is assigned to the same assignee as the present invention, and the disclosed material of which is incorporated herein by reference. The selector valve 78, when moved to a closed position, precludes the reverse flow of bypass air from the first bypass duct inlet 62 into the space 44 and prevents stalling of the first fan section 40. Translation of selector valve 78 may be accomplished by means of a hydraulic actuator of a variety well known in the art. The selector valve 78 is translated to a closed position shown in phantom lines of FIG. 1 in the single bypass mode of operation which occurs during high dry power and augmented engine operation. Accordingly, during this single bypass operating mode, all of the air pressurized by the first fan section 40 is directed through the second fan section 42 and is then split into two portions entering either the core engine inlet 24 or second bypass duct inlet 66.

In a double bypass mode of operation, the selector valve 78 is in an open position. During this double bypass operating mode, air pressurized by the first fan section 40 is split into two portions entering either the first bypass duct inlet 62 or the second fan section 42.

Referring to FIGS. 1 and 2, the slider valve 80 comprises a translating section of the downstream portion of the intermediate case 64. The slider valve 80 is positioned, by means of a hydraulic actuator 82 of a well-known variety, between the operative positions shown in solid and phantom lines in FIG. 1. The slider valve 80 may also be positioned by an actuator system as disclosed in U.S. Pat. No. 4,409, 778—Nash et al which is assigned to the same assignee as the present invention. It is to be noted that in the operative position of FIG. 1, wherein the slider valve 80 is at its full aft or closed position (in phantom lines), an orifice may be formed between the slider valve 80 and the inner casing 68. The slider valve 80 shown at its open position in solid lines of FIGS. 1 and 2 defines, in conjunction with the inner casing 68, an optimized diffuser flow path for the passage of pressurized air from the second bypass duct inlet 66. The slider valve 80 discharges the inner bypass stream, at the discharge of the forward VABI 76, by free expansion into the common bypass duct 74. In the single bypass operating mode, the first bypass duct inlet 62 is pressurized to a level above that in the space 44, thereby requiring closure of the selector valve 78 to prevent recirculation of air and stalling of the first fan section 40. The pressurized bypass flow is then ducted aft through the common bypass duct 74.

The combined flow through common bypass duct 74 is further mixed with the core engine combustion gases exiting the low pressure turbine 30, by a suitable mixer, such as a rear VABI (not shown), at the downstream end of the inner casing 68. A propulsive force is obtained by the action of the combined bypass and core engine exhaust streams being discharged from a variable area exhaust nozzle (not shown). For a detailed description of this type of variable cycle engine, refer to the previously referenced U.S. Pat. No. 4,068,471.

Referring to FIG. 3, the engine 10 incorporating the present invention is shown. The slider valve 80 is eliminated from the forward VABI 76. The splitter 70 is extended forward by an extension 88 near the trailing edge of the second fan section 42. More specifically, the extension 88 extends into the second fan section 42 and divides the stator vane 60 into an inner stator vane 90 and an outer stator vane 92. A forward portion 94 of the extension 88 is attached to the rotor blade 56 and has a rear or aft portion 96 to form a seal with the remainder of the extension 88. The forward portion 94 is preferably attached to the blade 56 in a manner, similar to a part span circumferential platform of a well-known type, to form an annulus or shroud. The forward portion 94 partially divides the blade 56 into an inner blade or hub portion 98 and an outer blade or tip portion 100 which allows the airflow past these portions to act essentially independent of each other from an aerodynamic standpoint. This independence is fostered at high corrected speed because of the supersonic nature of the flow in the leading edge region of the blade 56. Alternatively, the forward portion 94 of the extension 88 may be extended completely through to the leading edge of the blade 56 of the second fan section 42 to isolate the airflow past the inner blade portion 98 and outer blade portion 100 of the blade 56 to act completely aerodynamically independent of each other.

Alternatively, the forward portion 94 may be eliminated and a leading edge formed on the extension 88 of the splitter 70. The leading edge of the extension 88 may only be extended forward near the trailing edge of the blade 56 of second fan section 42. However, the airflow past the tip and hub portions of the blade 56 may be more dependent on each other, but act in a substantially aerodynamically independent manner. It should be appreciated that extending the extension 88 between the trailing and leading edge of the second fan section 42 is one of degree to allow or prevent communication between the airflows past the hub and tip portions to obtain the amount of aerodynamic independence desired.

Additionally, when there is communication between the airflows past the inner and outer blade portions 98 and 100 as shown in FIG. 3, either the outer stator vane 92 or strut 73, or both, may be formed to choke the airflow in the second bypass duct inlet 66. The choking is provided by contouring or forming the airflow boundary to form a throat that will choke the flow for predetermined operating conditions. In other words, the outer stator vane 92 and/or strut 73 could be formed to prevent the operating line of the second fan section 42 from dropping more than a predetermined amount or level such as five percent as the pressure in the first bypass duct inlet 62 drops. Alternatively, the intermediate casing 64 and/or inner casing 68 may be formed to choke the flow in the second bypass duct inlet 66 without using choked vanes. It should be appreciated that any suitable device may be used to choke the airflow in the second bypass duct inlet 66 such that a drop in the operating line of the flow past the tip portion 100 does not influence the flow past the hub portion 98.

The operation of the present invention of FIG. 3 is in many respects similar to FIGS. 1 and 2. In the single bypass mode of operation, the selector valve 78 is closed and all of the airflow exiting the first fan section 40 passes through the second fan section 42. The flow of the second fan section 42 is divided by the extension 88. The flow passing the inner blade portion 98, acting aerodynamically independent of the flow passing the outer blade portion 100, enters the inlet 24 of the compressor 20 of the core engine 18. The flow passing the outer blade portion 100 is bypassed through the second bypass duct inlet 66. Since the slider valve 80 is not present, the rear VABI can be adjusted to control the operating line of the outer blade portion 100 of the second fan section 42 in the single bypass operating mode. This is believed to be a significant difference between the configuration of FIGS. 2 and 3.

Additionally, the second bypass duct inlet 66 may be modified to choke the airflow in order to prevent the operating line of the second fan section 42 from dropping more than a predetermined amount as the pressure in the first bypass duct inlet 62 drops. This may be accomplished by suitable means as previously described.

Further, in the configuration depicted by FIG. 2, the bypass pressure level sets the operating line for the entire second fan section 42, and hence, impacts supercharging of the core engine 18. In the configuration of FIG. 3, only the operating line for the outer blade portion 100 is affected by a change in bypass pressure level due to the isolation or aerodynamic independence of the inner blade portion 98, and hence, supercharging of the core engine 18 is substantially unaffected.

Moreover, at part power or at part corrected speed, the pressure of the core engine 18 drops relative to the nominal operating line at the outer blade portion 100. Since the present invention of FIG. 3 does not affect supercharging of the core engine 18, there is no need to retain the operating line of the outer blade portion 100, but let it drop to remove an energy input that detracts from cycle performance. As a result of this difference in operating characteristics, the present invention provides a positive performance advantage. The drop in the operating line of the outer blade portion 100 provides for a match between bypass duct pressure and the pressure at the exit of the first fan section 40. As a result of the present invention, a slider valve for the forward VABI is not required to affect this pressure match since supercharging of the core engine 18 is not affected.

The present invention has been described in an illustrative manner. It is to be understood that the terminology which has been used is intended to be in the nature of words of description rather than of limitation.

Obviously, many modifications and variations of the present invention are possible in light of the above teachings. It is, therefore, to be understood that within the scope of the appended claims, the present invention may be practiced otherwise than as specifically described.

What is claimed is:

1. A variable cycle engine, comprising:
    a first fan section;
    a second fan section including a row of rotor blades disposed downstream of said first fan section and separated from said first fan section by a first space, wherein said first and second fan sections pressure a fan stream;
    a core engine for pressurizing a core stream and having a compressor at a core inlet, wherein said core inlet is disposed downstream of said second fan section and separated from said second fan section by a second space; and
    flow splitting means comprising a splitter encasing at least said core compressor and having an extension extending forward from said core inlet to at least near a trailing edge of said second fan section rotor blades for dividing the flow of the fan stream from said second fan section into a first portion for entering said core inlet and a second portion for bypassing said core inlet that act substantially aerodynamically independent of each other during operation of said variable cycle engine.

2. The engine of claim 1 including means for choking the second portion of flow bypassing said core inlet to prevent the operating line of the first portion from dropping below a predetermined level.

3. A variable cycle engine, comprising:
- a first fan section including a plurality of first rotatable fan blades;
- a second fan section including a plurality of second rotatable fan blades disposed downstream of said first fan section and separated from said first fan section by a first space, wherein said first and second fan sections pressurize a fan stream;
- a core engine for pressurizing a core stream and having a core inlet, a core compressor, a combustion chamber, a core turbine, wherein said core inlet is disposed downstream of said second fan section and separated from said second fan section by a second space;
- a bypass duct generally surrounding said core engine for bypassing a portion of the fan flow around said core engine;
- a first bypass duct inlet disposed within said first space for directing a first fan stream from said first fan section to said bypass duct;
- a second bypass duct inlet generally coannular with said first bypass duct inlet disposed within said second space and continuously open for directing a second fan stream from said second fan section to said bypass duct; and
- a dividing means forming said second inlet and extending forward to said second fan section for dividing the flow of the fan stream from said second fan section into first and second portions that act substantially aerodynamically independent of each other during operation of said variable cycle engine, whereby said first portion enters said core inlet and said second portion enters said second fan duct.

4. The engine of claim 3 wherein said dividing means comprises a splitter encasing at least said core compressor and having an extension extending forward into said second fan section.

5. The engine of claim 3 wherein said extension divides at least a portion of said second rotatable fan blades into separate portions.

6. The engine of claim 5 wherein said extension includes a separate forward portion attached to said second rotatable fan blades to divide said second rotatable fan blades into an inner and outer portion.

7. The engine of claim 6 wherein said forward portion has a rear extension to form a seal with the remainder of the extension.

8. The engine of claim 3 including means for choking the second portion of flow.

9. The engine of claim 8 wherein said choking means comprises a vane disposed in said second fan duct and attached to said dividing means.

10. The engine of claim 8 wherein said choking means comprises a strut disposed in said second fan duct and attached to said dividing means.

11. The engine of claim 8 wherein said choking means comprises at least one casing forming said second fan duct.

12. A variable cycle engine, comprising:
- a first fan section driven through a shaft and including a plurality of first rotatable fan blades;
- a second fan section including a plurality of second rotatable fan blades disposed downstream of said first fan section and separated from said first fan section by a first space;
- a core engine for pressurizing a core stream and having a core inlet, a core compressor, a combustion chamber, a core turbine and a core shaft drivingly connecting said core compressor, said second inlet is disposed downstream of said second fan section and separated from said second fan section by a second space;
- a first fan duct for directing a first fan stream and having a first inlet disposed within said first space;
- a second fan duct generally coannular with said first fan duct for directing a second fan stream and having a second, continuously open, inlet disposed within said second space;
- diverter means for diverting the flow exiting said first fan section between said first and second fan ducts;
- a splitter encasing at least said core compressor and forming said second inlet and having an extension extending forward into said second fan section to divide said second rotatable fan blades into separate portions act aerodynamically independent of each other, wherein said extension includes a separate forward portion attached to said second rotatable fan blades to divide said second rotatable fan blades into an inner and outer portion and a rear portion to form a seal with the remainder of the extension; and
- wherein said second fan section includes an inner second stator vane and an outer second stator vane attached to said extension.

13. A splitter for a double bypass variable cycle engine having a first fan, a second fan with rotatable fan blades, and a core engine with an inlet, to split a fan flow from the second fan rotatable fan blades into a second bypass flow and a core engine flow, said splitter comprising:
- an extension extending forward from the core engine inlet into the second fan section to divide said second rotatable fan blades into separate portions to allow the flow past the separate portions to act aerodynamically independent of each other, wherein said extension includes a separate forward portion attached to said rotatable fan blades to divide said second rotatable fan blades into an inner and outer portion and a rear portion to form a seal with the remainder of the extension.

14. A splitter as claimed in claim 13 further comprising an inner second stator vane portion and an outer second stator vane portion attached to said extension wherein said stator vane portions comprise a stator vane which with the rotatable blades comprise a fan stage.

* * * * *